United States Patent
Choi

(10) Patent No.: US 12,412,964 B2
(45) Date of Patent: Sep. 9, 2025

(54) SECONDARY BATTERY

(71) Applicant: Samsung SDI Co., Ltd., Yongin-si (KR)

(72) Inventor: Kyu Gil Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 17/664,197

(22) Filed: May 19, 2022

(65) Prior Publication Data

US 2022/0376366 A1  Nov. 24, 2022

(30) Foreign Application Priority Data

May 24, 2021  (KR) .................. 10-2021-0066081

(51) Int. Cl.
| | |
|---|---|
| *H01M 50/536* | (2021.01) |
| *H01M 4/02* | (2006.01) |
| *H01M 10/04* | (2006.01) |
| *H01M 50/533* | (2021.01) |

(52) U.S. Cl.
CPC ..... *H01M 50/536* (2021.01); *H01M 10/0468* (2013.01); *H01M 50/533* (2021.01); *H01M 4/02* (2013.01); *H01M 2004/027* (2013.01); *H01M 2004/028* (2013.01)

(58) Field of Classification Search
CPC ................................................. H01M 50/54
See application file for complete search history.

(56) References Cited

U.S. PATENT DOCUMENTS

| | | | |
|---|---|---|---|
| 10,629,942 B2 | 4/2020 | Lee et al. | |
| 2011/0053004 A1* | 3/2011 | Saruwatari | H01M 10/0525 |
| | | | 429/231.95 |
| 2015/0303412 A1 | 10/2015 | Lee | |

(Continued)

FOREIGN PATENT DOCUMENTS

| | | |
|---|---|---|
| CN | 208368668 U | 1/2019 |
| JP | H 1196982 A | 4/1999 |

(Continued)

OTHER PUBLICATIONS

Korean Office action for Application No. 10-2021-0066081, mailed May 2, 2023, 3 pages.

(Continued)

*Primary Examiner* — Matthew T Martin
*Assistant Examiner* — Krishna R Hammond
(74) *Attorney, Agent, or Firm* — Womble Bond Dickinson (US) LLP

(57) ABSTRACT

Embodiments of the present disclosure relate to a secondary battery, and may provide a secondary battery capable of protecting an electrode assembly and improving battery capacity relative to the same volume. Embodiments of the present disclosure include a secondary battery including an electrode assembly including a first electrode plate having a first substrate tab, a second electrode plate having a second substrate tab, and a separator interposed between the first electrode plate and the second electrode plate, a first lead welded to the first substrate tab, a second lead welded to the second substrate tab, a heat shrinkable tube around a thickness portion of the electrode assembly, and a case accommodating the electrode assembly.

7 Claims, 4 Drawing Sheets

(56) References Cited

U.S. PATENT DOCUMENTS

2018/0287184 A1* 10/2018 Lee
2020/0020926 A1*  1/2020 Ohsawa ................ H01M 4/386
2020/0343499 A1* 10/2020 Yoo ..................... H01M 10/625
2021/0074985 A1*  3/2021 Dawley ............... H01M 50/502

FOREIGN PATENT DOCUMENTS

| KR | 20110083894 A | * | 7/2011 |
| KR | 10-2014-0050182 A1 | | 4/2014 |
| KR | 2014-0066512 A | | 6/2014 |
| KR | 2014-0069419 A | | 6/2014 |
| KR | 102069504 B1 | | 4/2017 |
| KR | 2018-0084282 A | | 7/2018 |
| KR | 10-2074202 B1 | | 2/2020 |
| KR | 20200145682 A | * | 12/2020 |

OTHER PUBLICATIONS

Extended European Search Report for Application No. 22174999.7, mailed Oct. 21, 2022, 8 pages.
Chinese Office action for Application No. 202210573258.5, issued Dec. 25, 2023, with English translation, 17 pages.
Chinese Office action for Application No. 202210573258.5, issued Aug. 17, 2024, 6 pages.

* cited by examiner

SECONDARY BATTERY

CROSS-REFERENCE TO RELATED APPLICATION

This application claims priority to and the benefit of Korean Patent Application No. 10-2021-0066081 filed on May 24, 2021 in the Korean Intellectual Property Office, the entire content of which is incorporated by reference herein.

BACKGROUND

1. Field

Aspects of embodiments of the present disclosure relate to a secondary battery.

2. Description of the Related Art

Unlike a primary battery that cannot be recharged, a secondary battery can be recharged and discharged repeatedly. A low-capacity secondary battery comprised of one single cell packaged in the form of a pack may be used for various portable small-sized electronic devices, such as cellular phones or camcorders, and a high-capacity secondary battery in which several tens of cells are connected in a battery pack is widely used as a power source for motor drives, such as those in hybrid vehicles or electric vehicles.

The secondary battery may include an electrode assembly including a negative electrode and a positive electrode, a case for accommodating the same, terminals connected to the electrode assembly, and one or more other suitable components. Secondary batteries can be classified into circular, prismatic, and pouch types according to the shapes thereof. Specifically, the pouch-type secondary battery may be formed of a pouch exterior material that is easily deformed into various shapes and has a small weight.

The above information disclosed in this Background section is only for enhancement of understanding of the background of the present disclosure and may therefore contain information that does not constitute prior art.

SUMMARY

Embodiments of the present disclosure provide a secondary battery capable of protecting an electrode assembly.

In addition, embodiments of the present disclosure provide a secondary battery capable of improving the battery capacity relative to the same volume.

A secondary battery according to embodiments of the present disclosure may include: an electrode assembly including a first electrode plate including a first substrate tab, a second electrode plate including a second substrate tab, and a separator interposed between the first electrode plate and the second electrode plate; a first lead welded to the first substrate tab; a second lead welded to the second substrate tab; a heat shrinkable tube around a thickness portion of the electrode assembly; and a case accommodating the electrode assembly.

In addition, the heat shrinkable tube may have a width smaller than a thickness of the electrode assembly.

In addition, the electrode assembly may further include a plurality of first electrode plates, a plurality of second electrode plates, and a plurality of separators stacked together, wherein each of the first electrode plates may have a first substrate tab and the first substrate tabs may include first aligned portions bent and aligned in one direction and a first welded portion bent in an opposite direction from the one direction and welded to the first lead, wherein each of the second electrode plates may have a second substrate tab, the second substrate tabs may include second aligned portions bent and aligned in one direction and a second welded portion bent in an opposite direction from the one direction and welded to the second lead, and wherein the heat shrinkable tube may pass over the first and second welded portions.

In addition, the electrode assembly may further include a plurality of first electrode plates, a plurality of second electrode plates, and a plurality of separators stacked together, wherein each of the first electrode plates may have a first substrate tab, the first substrate tabs may include first aligned portions bent and aligned in one direction and a first welded portion bent in an opposite direction from the one direction and welded to the first lead, wherein each of the second electrode plates may have a second substrate tab and the second substrate tabs may include second aligned portions bent and aligned in one direction and a second welded portion bent in an opposite direction from the one direction and welded to the second lead, and wherein the heat shrinkable tube may pass between the first aligned portions and the first welded portion, and between the second aligned portions and the second welded portion.

In addition, the heat shrinkable tube may have a greater width than that of the first welded portion and the second welded portion.

In addition, the heat shrinkable tube may have a lower heat skinkage temperature than the separator.

In addition, the heat shrinkable tube may be made of polyethylene, polypropylene, polyvinyl chloride, polyester, polyethylene terephthalate, ethylene propylene rubber, isoprene rubber, chloroprene rubber, styrene butadiene rubber, nitrile butadiene rubber, Teflon, or a combination thereof.

BRIEF DESCRIPTION OF DRAWINGS

Features, aspects and principles of the present disclosure will be better understood by reference to the following detailed description when considered in conjunction with the following drawings. These drawings should not be construed as limiting the present disclosure, but are intended to be illustrative only.

DETAILED DESCRIPTION

Figure 1:
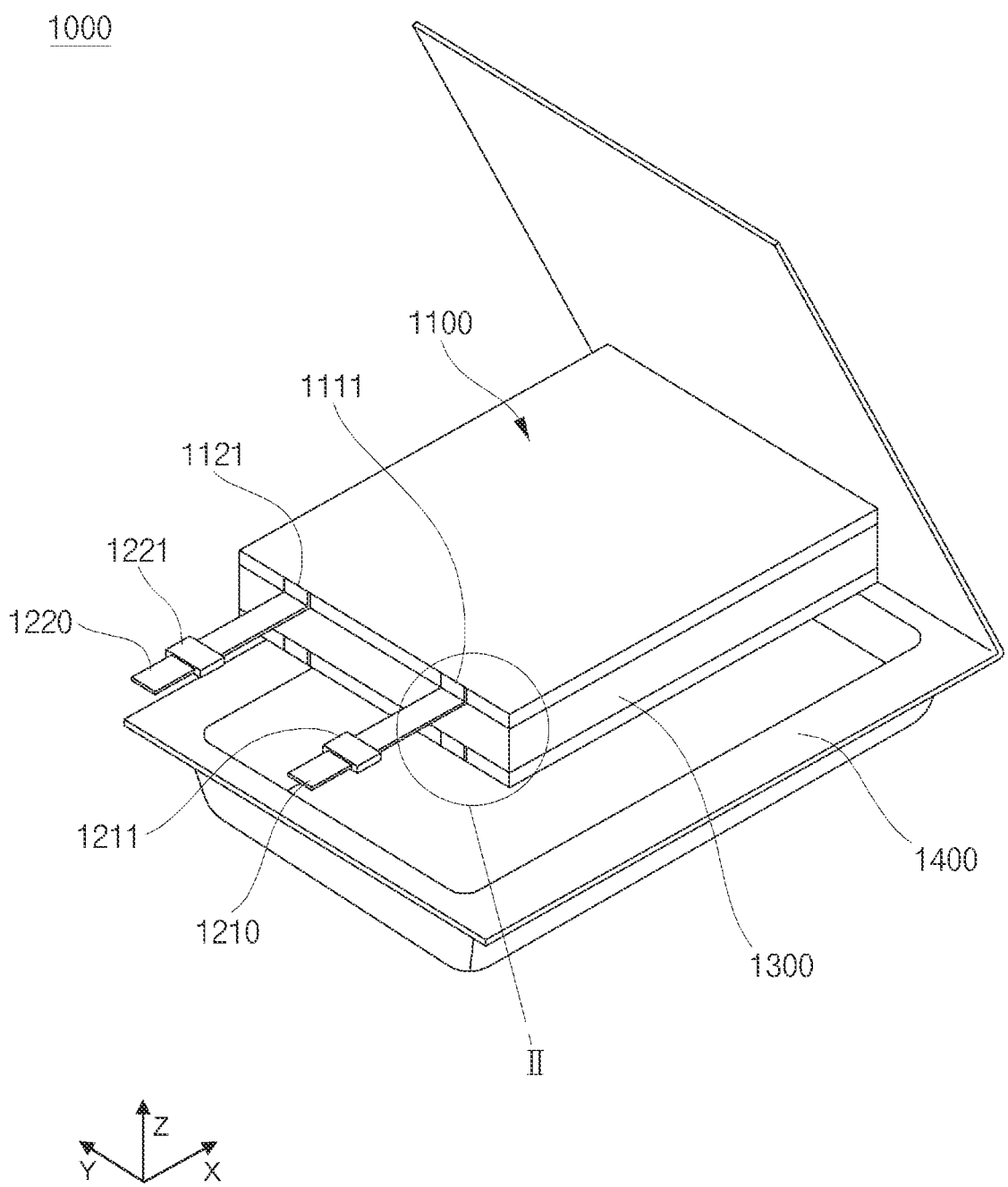
FIG. 1 is a schematic perspective view showing a secondary battery according to an embodiment of the present disclosure.

Hereinafter, illustrative embodiments of the present disclosure will be described in detail with reference to the accompanying drawings.

Examples of the present disclosure are provided to more completely explain the present disclosure to those skilled in the art, and the following examples may be modified in various other forms. The present disclosure, however, may be embodied in many different forms and should not be construed as being limited to the example (or exemplary) embodiments set forth herein. Rather, these example embodiments are provided so that this disclosure will be thorough and complete and will convey the aspects and features of the present disclosure to those skilled in the art. Accordingly, processes, elements, and techniques that are not necessary to those having ordinary skill in the art for a complete understanding of the aspects and features of the present invention may not be described.

In addition, in the accompanying drawings, sizes or thicknesses of various components are exaggerated for brevity and clarity. Like numbers refer to like elements throughout and unless otherwise noted, descriptions thereof may not be repeated. As used herein, the term "and/or" includes any and all combinations of one or more of the associated listed items. In addition, it will be understood that when an element A is referred to as being "on" or "connected to" an element B, the element A can be directly on or connected to the element B or an intervening element C may be present therebetween such that the element A and the element B are indirectly on or connected to each other. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms that the terms "comprise," "comprising," "include" and/or "including" when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the term "below" can encompass both an orientation of above and below.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
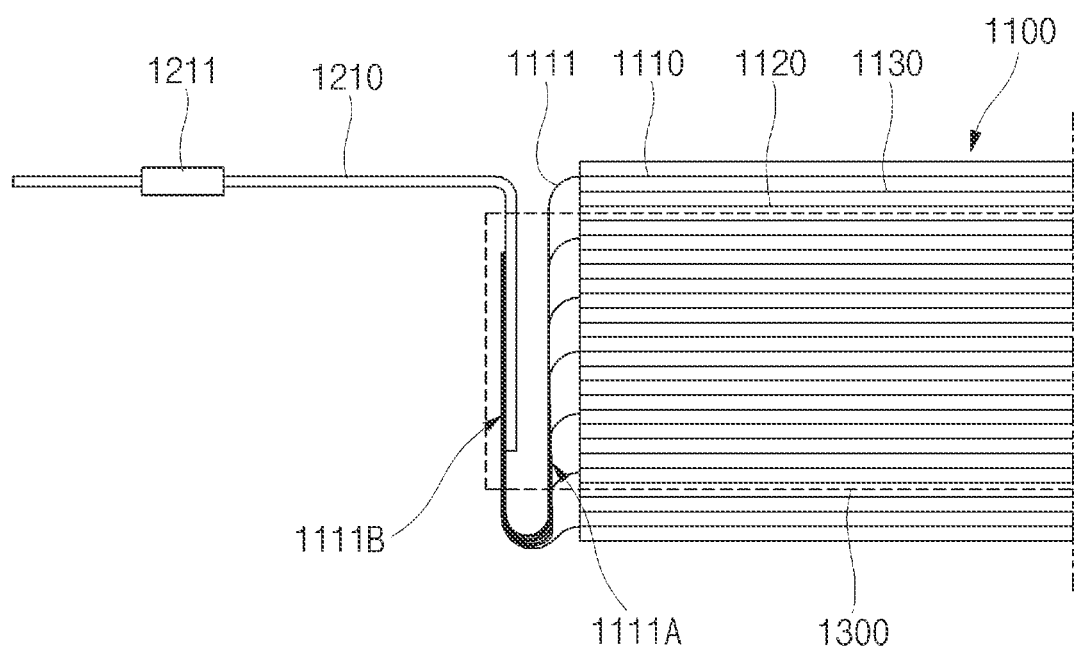
FIG. 2 is a side view illustrating a portion of the secondary battery corresponding to a region II in FIG. 1.

FIG. 1 is a schematic perspective view showing a secondary battery 1000 according to an embodiment of the present disclosure. FIG. 2 is a side view illustrating a portion of the secondary battery 1000 corresponding to a region II in FIG. 1, in which a heat shrinkable tube 1300 is indicated by a dashed line.

Referring to FIGS. 1 and 2, the secondary battery 1000 includes an electrode assembly 1100, a first lead 1210, a second lead 1220, a heat shrinkable tube 1300, and a case 1400.

The electrode assembly 1100 includes a first electrode plate 1110, a second electrode plate 1120, and a separator 1130.

The first electrode plate 1110 may be any one of a negative electrode plate and a positive electrode plate. When the first electrode plate 1110 is a negative electrode plate, the first electrode plate 1110 may include, for example, but not limited to, a negative electrode coating portion coated with a negative electrode active material on a negative electrode current collector plate made of a thin conductive metal plate, for example, copper or nickel foil or mesh, and a negative electrode uncoated portion on which the negative electrode active material is not coated. In some embodiments, the negative active material may include, for example, but not limited to, a carbon-based material, Si, Sn, tin oxide, a tin alloy composite, a transition metal oxide, lithium metal nitrite, and/or a metal oxide. In addition, the first electrode plate 1110 may include a first substrate tab 1111 formed by punching the negative electrode uncoated portion.

The second electrode plate 1120 may be any one of a negative electrode plate and a positive electrode plate. When the first electrode plate 1110 is a negative electrode plate, the second electrode plate 1120 may become a positive electrode plate. In such embodiments, the second electrode plate 1120 may include, for example, but not limited to, a positive electrode coating portion coated with a positive electrode active material on a positive electrode current collector plate made of a thin metal plate having excellent conductivity, for example, aluminum foil or mesh, and a positive electrode uncoated portion on which the positive electrode active material is not coated. Here, the positive active material may include, for example, but not limited to, a chalcogenide compound, for example, a composite metal oxide, such as $LiCoO_2$, $LiMn_2O_4$, $LiNiO_2$, and/or $LiNiMnO_2$. In addition, the second electrode plate 1120 may include a second substrate tab 1121 formed by punching the positive electrode uncoated portion.

The separator 1130 is interposed between the first electrode plate 1110 and the second electrode plate 1120 to prevent (or protect from) an electrical short between the first electrode plate 1110 and the second electrode plate 1120.

The separator 1130 may be made of, for example, but not limited to, polyethylene, polypropylene, a porous copolymer of polyethylene and polypropylene, and/or one or more suitable materials. In addition, in order to effectively prevent (or protect from) an electric short between the first electrode plate 1110 and the second electrode plate 1120, the separator 1130 may have a larger area than the first electrode plate 1110 and the second electrode plate 1120.

The electrode assembly 1100 may be divided into a winding type and a stacking type according to a manufacturing method. In the drawings, the electrode assembly 1100 of stacking type is illustrated by way of example, and for convenience of understanding, the following description will be made on the basis that the electrode assembly 1100 is of a stacking type with reference to the drawings, however, the present disclosure is not limited thereto. In addition, hereinafter, for convenience of explanation, a wide portion (a side surface parallel to the X-Y plane on the basis of the drawing, e.g., FIG. 1) in the electrode assembly 1100 is referred to as a "plate-surface portion", and a narrow portion (a X-Z plane, a side surface parallel to the Y-Z plane on the basis of the drawing, e.g., FIG. 1) is referred to as a "thickness portion".

In some embodiments, the electrode assembly 1100 is formed by stacking the first electrode plate 1110, the separator 1130, the second electrode plate 1120, and the separator 1130 in that order, and the stacking may be performed such that the first substrate tab 1111 (including a plurality of first substrate tabs 1111 as shown, e.g., in FIG. 2) are arranged side by side, and second substrate tabs 1121 are arranged side by side with the second substrate tabs 1121.

The first lead 1210 may have one end fixed (for example, welded) to the first substrate tab 1111, and the other end protruding and extending to the outside. A process for fixing the first lead 1210 and the first substrate tab 1111 will now be described in more detail.

The process for fixing the first lead 1210 and the first substrate tab 1111 may be performed through: a first bending step of bending and aligning a plurality of first substrate tabs 1111 in one direction; a cutting and tack-welding step of collecting the aligned portions into one and cutting and tack-welding the ends thereof together; a welding step of welding the tack-welded portion to the first lead 1210; and a second bending step of bending the welded portion in an opposite direction to the first bending step. Hereinafter, for convenience of explanation, portions in which the first substrate tabs 1111 are bent in one direction and aligned are referred to as first aligned portions 1111A, and portions of the first substrate tabs 1111 which are welded to the first lead 1210 are referred to as a first welded portion 1111B (see, e.g., FIG. 2). The first lead 1210 may include a first insulating member 1211 for preventing (or protecting from) a short circuit to the case 1400.

The second lead 1220 may have one end fixed (for example, welded) to the second substrate tab 1121, and the other end protruding and extending to the outside. Similarly, the process for fixing the second lead 1220 and the second substrate tab 1121 may also be performed through: a first bending step of bending and aligning a plurality of second substrate tabs 1121 in one direction; a cutting and tack-welding step of collecting the aligned portions into one and cutting and tack-welding the ends thereof together; a welding step of welding the tack-welded portion to the second lead 1220; and a second bending step of bending the welded portion in an opposite direction to the first bending step. Hereinafter, for convenience of explanation, portions in which the second substrate tabs 1121 are bent in one direction and aligned are referred to as second aligned portions, and portions of the second substrate tabs 1121 which are welded to the second lead 1220 are referred to as a second welded portion. The second lead 1220 may include a second insulating member 1221 for preventing (or protecting from) a short circuit to the case 1400.

The heat shrinkable tube 1300 surrounds (or is around) the thickness portion of the electrode assembly 1100. During fall and safety evaluation in the course of manufacturing the secondary battery 1000, a portion of the electrode assembly 1100, for example, in the case of the electrode assembly 1100 of stacking type, a thickness portion thereof, to which an electrode plate is exposed, may be weakened. In some embodiments, the heat shrinkable tube 1300 may surround or be around and protect the thickness portion of the electrode assembly 1100.

In some embodiments, in the secondary battery 1000 according to an embodiment of the present disclosure, the heat shrinkable tube 1300 surrounds (or is around) the thickness of the electrode assembly 1100 so as to pass over the first welded portion 1111B and the second welded portion. Accordingly, since the heat shrinkable tube 1300 covers the first welded portion 1111B and the second welded portion, the case 1400 can be prevented (or protected) from being damaged due to burrs that may occur during welding. In addition, the heat shrinkable tube 1300 may press the first and second substrate tabs 1111 and 1121 and thus allow the first and second substrate tabs 1111 and 1121 to be bent more firmly, thereby reducing the space occupied by the first and second substrate tabs 1111 and 1121 inside the case 1400.

The heat shrinkable tube 1300 may have a width equal to or smaller than the thickness of the electrode assembly 1100 (a length in the Z-axis direction on the basis of the drawing, e.g., FIG. 1). In other words, the heat shrinkable tube 1300 may surround (or be around) only the thickness portion of the electrode assembly 1100, and may not surround (or be around) the plate surface portion of the electrode assembly 1100. When the heat shrinkable tube 1300 surrounds (or is around) the plate-surface portion of the electrode assembly 1100, due to the thickness of the heat shrinkable tube 1300, the overall thickness of the electrode assembly 1100 and the heat shrinkable tube 1300 may increase, thereby reducing the battery capacity relative to the same volume accordingly. Therefore, by preventing the heat shrinkable tube 1300 from surrounding (or being around) the plate-surface portion of the electrode assembly 1100, the battery capacity can be improved. However, the heat shrinkable tube 1300 may have a width equal to or greater than that of the first welded portion 1111A and the second welded portion (in the Z-axis direction on the basis of the drawing, e.g., FIG. 1). This is to effectively protect the case 1400 by allowing the heat shrinkable tube 1300 to entirely cover the first welded portion 1111A and the second welded portion. In addition, the heat shrinkable tube 1300 may include, for example, but not limited to, an insulating polymer resin, such as polyethylene, polypropylene, polyvinyl chloride, polyester, polyethylene terephthalate, ethylene propylene rubber, isoprene rubber, chloroprene rubber, styrene butadiene rubber, nitrile butadiene rubber, polytetrafluoroethylene (PTFE)(TEFLON®), and/or a combination thereof. TEFLON® is a registered trademark of The Chemours Company FC, LLC, Wilmington Delaware In addition, the heat shrinkable tube 1300, in some embodiments, has a lower heat shrinkage temperature than the separator 1130. Considering that the separator 1130 often undergoes heat shrinkage at a temperature higher than about 130° C., the heat shrinkable tube 1300 may have a heat shrinkage temperature of about 130° C. or less, for example, about 60° C. to about 130° C.

The case 1400 accommodates the electrode assembly 1100 and may be formed by thermal fusion along the circumference in a so-called pouch shape. The case 1400 may be formed in a multilayer or laminate structure including, for example, but not limited to, a first insulating layer, a metal layer, and/or a second insulating layer.

Figure 3:
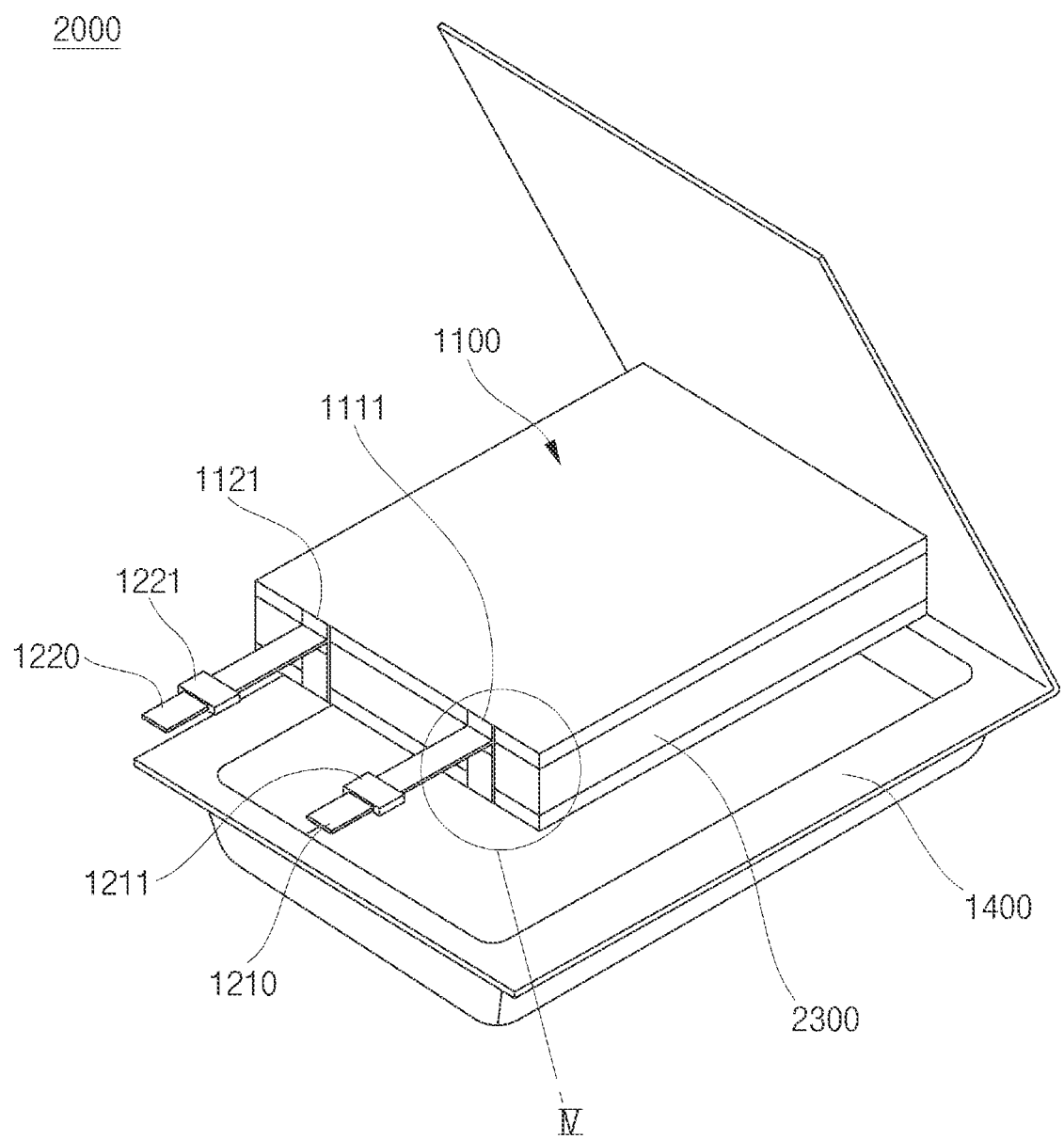
FIG. 3 is a schematic perspective view illustrating a secondary battery according to another embodiment of the present disclosure.
Figure 3:
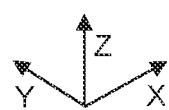
Figure 4:
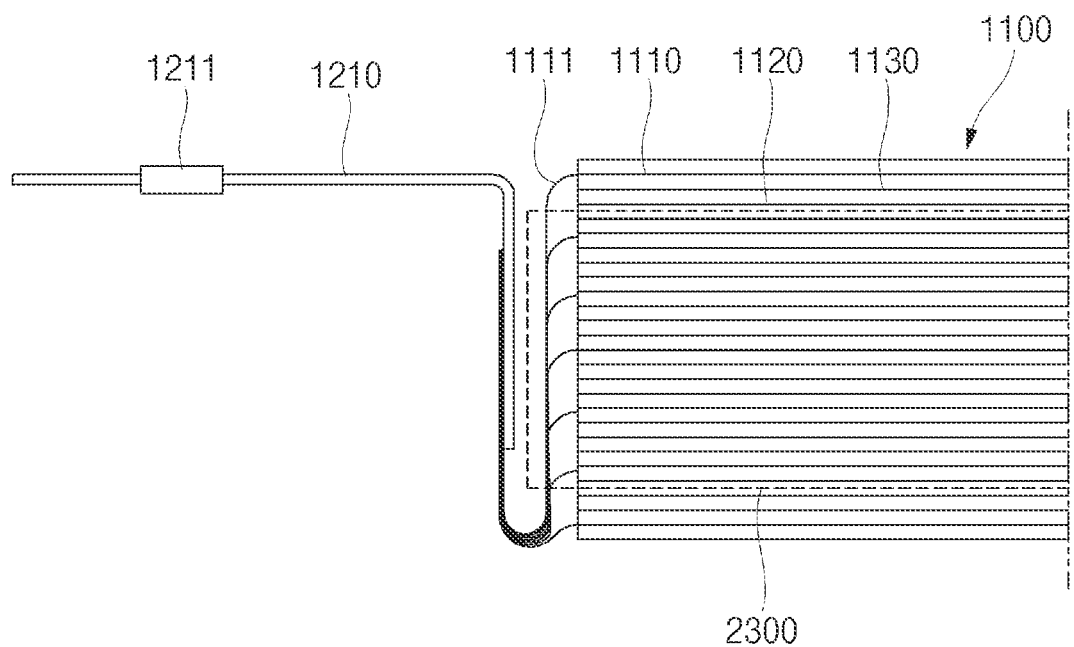
FIG. 4 is a side view illustrating a portion of the secondary battery corresponding to a region IV in FIG. 3.

FIG. 3 is a perspective view illustrating a secondary battery 2000 according to another embodiment of the present disclosure, and FIG. 4 is a side view illustrating a portion corresponding to a region IV in FIG. 3, in which a heat shrinkable tube 2300 is indicated by a dashed line.

The secondary battery 2000 according to the present embodiment differs from the secondary battery 1000 with respect to the position in which the heat shrinkable tube 2300 is installed. Other parts are substantially the same or amount to a degree that is expected for a person skilled in the art to change naturally in response to said difference, and thus repetitive descriptions thereof will be omitted. The following description will focus on the heat shrinkable tube 2300.

Referring to FIGS. 3 and 4, the heat shrinkable tube 2300 surrounds (or is around) a thickness portion of the electrode assembly 1100 so as to pass between the first aligned portions 1111A and the first welded portion 1111B, and between the second aligned portions and the second welded portion.

In order to fix the first and second leads 1210 and 1220 and the first and second substrate tabs 1111 and 1121, respectively, the fixing process may be performed through: a first bending step of bending and aligning a plurality of first and second substrate tabs 1111 and 1121 in one direction; a cutting and tack-welding step of collecting the aligned portions into one and cutting and tack-welding the ends thereof together; a welding step of welding the tack-welded portion to the first and second leads 1210 and 1220; and a second bending step of bending the welded portion in a direction opposite to the first bending step, and the heat shrinkable tube 2300 may be installed between the first bending step and the cutting and tack-welding step. That is, after the first and second substrate tabs 1111 and 1121 are aligned by bending the same in one direction, respectively, the heat shrinkable tube 2300 may be subjected to heat-shrinking by surrounding (or positioning the heat shrinkable tube 2300 around) the thickness portion of the electrode assembly 1100 with the heat shrinkable tube 2300 so that the heat shrinkable tube 2300 passes over the aligned portions (the first aligned portions 1111A and the second aligned portions). Then, the cutting and tack-welding step may be performed.

Alternatively, the heat shrinkable tube 2300 may be installed between the cutting and tack-welding step and the welding step. That is, the cutting and tack-welding step may be performed, and the heat shrinkable tube 2300 may then be thermally shrunken by surrounding (or positioning the heat shrinkable tube 2300 around) the thickness portion of the electrode assembly 110 with the heat shrinkable tube 2300 so that the heat shrinkable tube 2300 passes over the first aligned portions 1111A and the second aligned portions. Then, the welding step may be performed.

Alternatively, the heat shrinkable tube 2300 may be installed between the welding step and the second bending step. That is, the welding step may be performed, and the heat shrinkable tube 2300 may then be thermally shrunken by surrounding (or positioning the heat shrinkable tube 2300 around) the thickness portion of the electrode assembly 110 with the heat shrinkable tube 2300 so that the heat shrinkable tube 2300 passes over the first aligned portions 1111A and the second aligned portions. Then, the second bending step may be performed.

Embodiments of the present disclosure provide a secondary battery that can be protected by a heat shrinkable tube surrounding (or being around) the thickness portion of an electrode assembly.

In embodiments of the present disclosure, by preventing the heat shrinkable tube from surrounding the plate surface of the electrode assembly, a volumetric increase can be minimized. In addition, the heat shrinkable tube may press the first and second substrate tabs, and thus the first and second substrate tabs can be bent more firmly, thereby reducing the space occupied by the first and second substrate tabs inside the case. This may contribute to improving the battery capacity relative to the same volume.

While the present disclosure describes illustrative embodiments for carrying out the secondary battery of the present disclosure, the present disclosure is not so limited and it will be understood by a person skilled in the art that various changes in form and details may be made herein without departing from the spirit and scope of the present disclosure as defined by the following claims and their equivalents.

What is claimed is:

1. A secondary battery comprising:
an electrode assembly comprising:
a first electrode plate comprising a first substrate tab,
a second electrode plate comprising a second substrate tab, and
a separator interposed between the first electrode plate and the second electrode plate, the first electrode plate, the separator, and the second electrode plate being stacked in a stacking direction;
a first lead welded to the first substrate tab;
a second lead welded to the second substrate tab;
a heat shrinkable tube entirely surrounding a thickness portion of the electrode assembly; and
a case accommodating the electrode assembly,
wherein the heat shrinkable tube does not cover a plate surface portion of the electrode assembly, and
wherein the thickness portion of the electrode assembly is an outer surface of the electrode assembly that is parallel to the stacking direction, and the plate surface portion of the electrode assembly is an outer surface of the electrode assembly that is perpendicular to the stacking direction.

2. The secondary battery of claim 1, wherein:
the first electrode plate comprises a plurality of first electrode plates comprising a plurality of first substrate tabs,
the second electrode plate comprises a plurality of second electrode plates comprising a plurality of second substrate tabs, and
the separator comprises a plurality of separators; and
wherein each of the first electrode plates has a first substrate tab of the first substrate tabs, and the first substrate tabs comprise first aligned portions bent and aligned in one direction and a first welded portion bent in an opposite direction from the one direction and welded to the first lead;
wherein each of the second electrode plates has a second substrate tab of the second substrate tabs, and the second substrate tabs comprise second aligned portions bent and aligned in one direction and a second welded portion bent in an opposite direction from the one direction and welded to the second lead; and wherein the heat shrinkable tube passes over the first and second welded portions.

3. The secondary battery of claim 2, wherein the heat shrinkable tube has a greater width than a width of the first welded portion and greater than a width of the second welded portion.

4. The secondary battery of claim 1, wherein:

the first electrode plate comprises a plurality of first electrode plates comprising a plurality of first substrate tabs, the second electrode plate comprises a plurality of second electrode plates comprising a plurality of second substrate tabs, and the separator comprises a plurality of separators; and wherein each of the first electrode plates has a first substrate tab of the first substrate tabs, and the first substrate tabs comprise first aligned portions bent and aligned in one direction and a first welded portion bent in an opposite direction from the one direction and welded to the first lead;

wherein each of the second electrode plates has a second substrate tab of the second substrate tabs, and the second substrate tabs comprise second aligned portions bent and aligned in one direction and a second welded portion bent in an opposite direction from the one direction and welded to the second lead; and wherein the heat shrinkable tube passes between the first aligned portions and the first welded portion, and between the second aligned portions and the second welded portion.

5. The secondary battery of claim 4, wherein the heat shrinkable tube has a greater width than a width of the first welded portion and greater than a width of the second welded portion.

6. The secondary battery of claim 1, wherein the heat shrinkable tube has a lower heat shrinkage temperature than the separator.

7. The secondary battery of claim 1, wherein the heat shrinkable tube is made of polyethylene, polypropylene, polyvinyl chloride, polyester, polyethylene terephthalate, ethylene propylene rubber, isoprene rubber, chloroprene rubber, styrene butadiene rubber, nitrile butadiene rubber, Teflon, or a combination thereof.

* * * * *